United States Patent [19]
Cummings

[11] Patent Number: 6,023,721
[45] Date of Patent: Feb. 8, 2000

[54] METHOD AND SYSTEM FOR ALLOWING A SINGLE-USER APPLICATION EXECUTING IN A MULTI-USER ENVIRONMENT TO CREATE OBJECTS HAVING BOTH USER-GLOBAL AND SYSTEM GLOBAL VISIBILITY

[75] Inventor: Christopher R. Cummings, Parkland, Fla.

[73] Assignee: Citrix Systems, Inc., Fort Lauderdale, Fla.

[21] Appl. No.: 08/855,901

[22] Filed: May 14, 1997

[51] Int. Cl.[7] .................................................. G06F 15/16
[52] U.S. Cl. .......................... 709/201; 709/202; 709/203; 709/104; 709/107; 707/8; 707/10
[58] Field of Search ............................. 395/200.3–200.33, 395/200.57–200.59, 674, 676–677, 680, 682–684; 709/200–203, 227–229, 100–108, 302–304; 707/8–10

[56] References Cited

U.S. PATENT DOCUMENTS

| | | | |
|---|---|---|---|
| 4,887,204 | 12/1989 | Johnson et al. | 707/10 |
| 5,175,852 | 12/1992 | Johnson et al. | 707/8 |
| 5,187,790 | 2/1993 | East et al. | 709/304 |
| 5,202,971 | 4/1993 | Henson et al. | 707/8 |
| 5,233,701 | 8/1993 | Nakata | 707/8 |
| 5,297,283 | 3/1994 | Kelly, Jr. et al. | 709/104 |
| 5,321,841 | 6/1994 | East et al. | 709/107 |
| 5,329,619 | 7/1994 | Page et al. | 709/203 |
| 5,341,478 | 8/1994 | Travis, Jr. et al. | 709/203 |
| 5,457,797 | 10/1995 | Butterworth et al. | 709/302 |
| 5,537,546 | 7/1996 | Sauter | 709/230 |
| 5,550,976 | 8/1996 | Gilchrist et al. | 709/201 |
| 5,553,242 | 9/1996 | Russell et al. | 709/227 |
| 5,572,674 | 11/1996 | Ernst | 709/221 |
| 5,581,765 | 12/1996 | Munroe et al. | 709/107 |
| 5,583,992 | 12/1996 | Kudo | 709/201 |
| 5,598,562 | 1/1997 | Cutler et al. | 709/104 |
| 5,768,505 | 6/1998 | Gilchrist et al. | 709/201 |

FOREIGN PATENT DOCUMENTS

| | | | |
|---|---|---|---|
| 0 381 645 | 8/1990 | European Pat. Off. | G06F 15/16 |
| 0 648 038 A2 | 4/1995 | European Pat. Off. | H04L 29/06 |
| WO 94/14114 | 6/1994 | WIPO | G06F 9/00 |

OTHER PUBLICATIONS

Hoff, A. "Java and Internet Programming", *Dr. Dobbs's Journal*, (Aug., 1995) pp. 56, 58, 60–61 and 101–102.

Holtzman, Jeff; "Merge 386; Run Unix and DOS together on an 80386";*Byte*, (Dec. 1988) pp. cover sheet; 207–208, 211–212.

"IBM Operating System/2 Version 1.2 Profile Validation Hooks" IBM publication, (Nov. 22, 1989) pp. i–vi, 1–26.

Prasad, Shashi, "Weaving a Thread", *Byte*, (Oct. 1995) pp. 173–174.

Schemers, R.J., *Update*, //www–leland.stanford.edu/~schemers/docs/lbnamed/lbnamed.html, Sep.17, 1995, pp. 1–5.

Singleton, A.; "Wired On The Web";*Byte*, vol. 21, No. 1, (Jan. 1996) pp. 77–78, 80.

Udell, Jon, "Citrix's New Multiuser OS/2; OS/2–based Workgroup Computing Without a LAN",*Byte*, vol. 16, No. 1, (Jan. 1991) pp. 4, 134–136, 138.

Unger, John, "The Sun386i; A Unix Color Graphics Workstation That Runs MS–DOS",*Byte*, (Dec. 1988), pp. cover sheet, 183–188.

*Primary Examiner*—Zarni Maung
*Assistant Examiner*—Bharat Barot
*Attorney, Agent, or Firm*—Testa, Hurwitz & Thibeault, LLP

[57] ABSTRACT

A method and system for allowing a single-user application executing in a multi-user environment to create objects having both user-global and system-global visibility begins by intercepting an API function call to create or modify a named object. A set of rules is consulted which may explicitly or implicitly define the visibility to be associated with the named object. If a rule is found for the named object it is used to define the visibility level for that object. If, however, a rule is not encountered in the rule set, then the visibility of a named object is set according to a default procedure.

15 Claims, 3 Drawing Sheets

METHOD AND SYSTEM FOR ALLOWING A SINGLE-USER APPLICATION EXECUTING IN A MULTI-USER ENVIRONMENT TO CREATE OBJECTS HAVING BOTH USER-GLOBAL AND SYSTEM GLOBAL VISIBILITY

FIELD OF THE INVENTION

The invention relates to multi-user distributed process systems having a master process and a plurality of service processes and a method for adapting applications written for a single user environment for use in the multi-user system without recompiling.

BACKGROUND OF THE INVENTION

The distributed process system described is a multi-user and multi-tasking system. Applications written for a multi-user environment typically assume that more than one copy of the application may be active at the same time. Multi-tasking operating systems (Windows NT and Unix, for example) provide the capability to create various types of shared objects for providing interprocess communications and synchronization. By associating a name with an object, it allows for one process to create an object and for another process to make use of it.

Synchronization ensures that only one process has control of a resource at a time. Resources include objects such as global variables, common data memory, file handles, and shared object handles. Shared objects used for synchronization and interprocess communication include: semaphores and event objects for coordinating threads; mutexes, a mutually exclusive semaphore allowing a single thread access at a time; named pipes, for duplexed interprocess and interprocessor connection; message queues, for one way, many-to-one communication; and shared memory, for use by all processes that have authorized access. If an application was written for a single user for running under a single user operating system, such as Windows NT (produced by Microsoft Corp. of Redmond, Wash., and then is run in a multi-user operating system, such as WinFrame™ (produced by Citrix Systems, Inc. of Coral Springs, Fla.), in a multi-user operating environment, it is possible for name collisions to occur if more than one copy of the same application is executed at the same time. The application would have to be modified and recompiled in order for it to execute reliably in the multi-user environment.

This problem may be overcome as described in co-pending patent application Ser. No. 08/541,020 filed Oct. 11, 1995, still pending, the contents of which are incorporated herein by reference. In brief overview, the solution described in U.S. Ser. No. 08/541,020 involves:

a) assigning a unique identifier to each user on the system and each of the user's applications, and attaching this same identifier to each instance of an object created by the user's applications, for the purpose of creating a distinct single user name space that is only accessible by the same single user (i.e. the variable has "user global" visibility); and b) enabling a server process that is serving the application of the single user process to impersonate the single user process by assuming the identity of the single user process, for allowing the server process to access the single user name space.

In this manner, the server process assumes the role of the user, has access to the user's private name space and to all objects required for serving the user's application. The combination of user labeling and user impersonation allows multiple copies of a given application to run simultaneously even though the application was written for a single-user operating system.

Unfortunately, this approach does not perform well for applications in which some objects must be distinct for each client space while other objects must be shared by all clients (i.e. the variable must have "system global" visibility), because attaching the same user identifier to each instance of an object created by a user's application generates separate user spaces for each user.

This drawback precludes applications from engaging in legitimate interprocess communication. For example, an application may use a semaphore to control access to a scarce resource, such as a hardware device or port. Using the approach described above, each client would instantiate its own unique semaphore, defeating its access-control purpose.

SUMMARY OF INVENTION

The present invention relates to a system and method for allowing a single-user application to be executed in a multi-user environment without requiring the application to be modified for the environment. Additionally, the visibility of named objects is set on a per-object basis which allows individual applications to create and modify named objects which are not shared with other client contexts while creating and modifying other named objects which are shared between various client contexts.

In one aspect, the invention relates to a method for allowing an unmodified single-user application program to operate in a multi-user operating system environment and to create both user-global objects and system-global objects. The method begins by intercepting an application request to instantiate an object, generally performed as an API function call. Once the request is intercepted, a visibility level is determined for the object to be created. In some embodiments the visibility level is determined by accessing a set of rules which associates various named objects with visibility levels. The requested object is created and the determined visibility level is associated with the instantiated object.

In another aspect, the invention relates to an article of manufacture having computer readable program means for allowing unmodified single-user application program to operate in a multi-user operating system environment and to create both user-global and system-global objects. The article includes computer-readable programs means for intercepting an application request to instantiate an object, computer-readable program means for determining a visibility level for the object to be created, computer readable program means for creating the requested object, and computer readable program means for assigning the determined visibility level to the instantiated object.

BRIEF DESCRIPTION OF THE DRAWINGS

The invention is pointed out with particularity in the appended claims. The advantages of this invention described above, as well as further advantages, may be better understood by referring to the following description taken in conjunction with the accompanying drawings. In the drawings, like reference numerals are intended to refer to the same parts throughout the different views. The drawings are not generally to scale, emphasis being placed on illustrating the principles of the invention.

DETAILED DESCRIPTION

Figure 1:
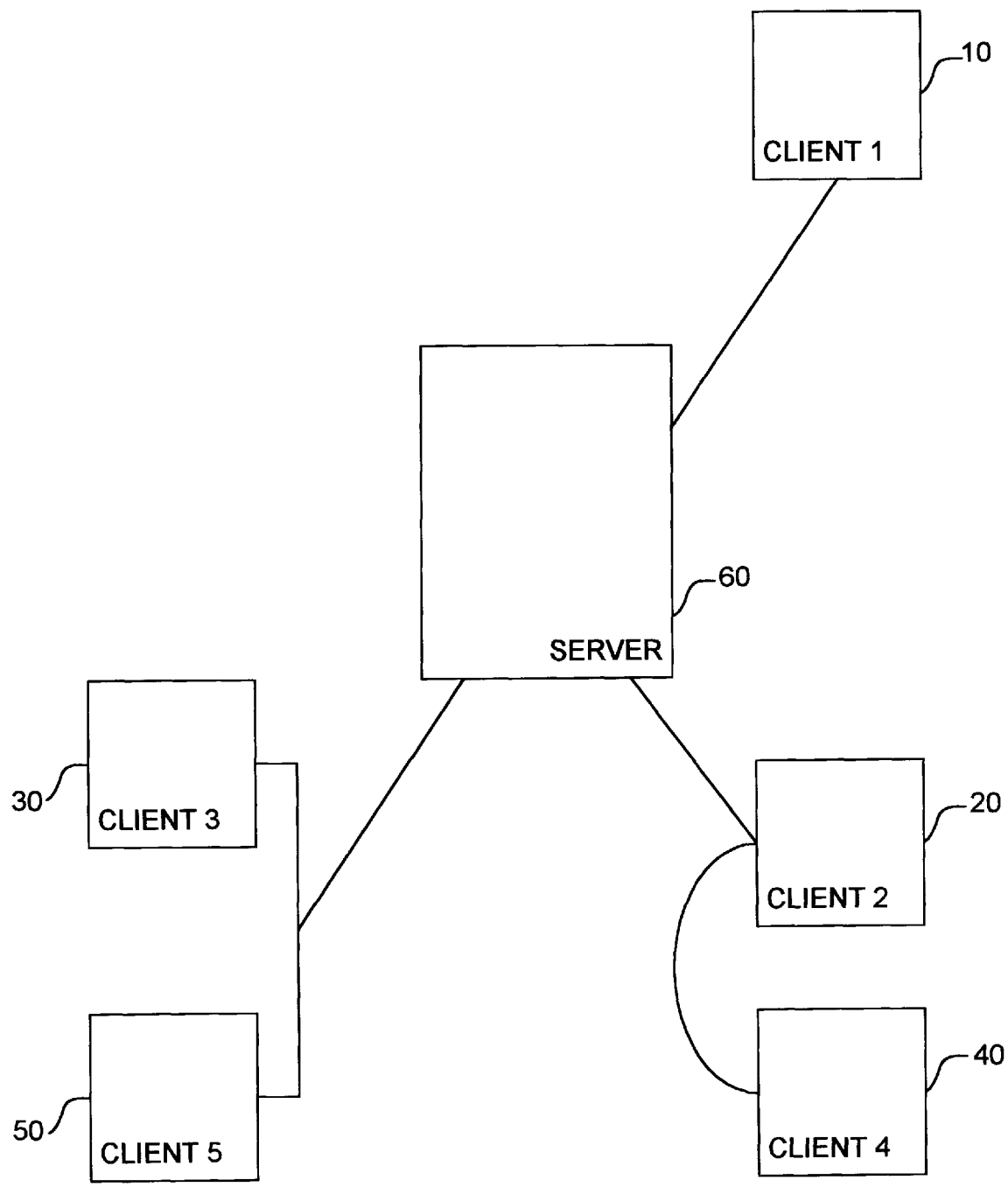
FIG. 1 is a diagram of an embodiment of a local network on which the invention may be practiced.

Referring to FIG. 1, an embodiment of a client-server network over which the invention may be practiced is shown. Although FIG. 1 depicts a system where one server 60 services a number of clients 10, 20, 30, 40, 50, more than one server 60 may be provided and each server may service one or more client nodes. Additionally, for embodiments in which multiple servers are provided, one client node may be service by more than one server node.

As depicted in FIG. 1, client nodes 10, 20, 30, 40, 50 may connect to a server node 60 using any of number of physical topologies. For example, client nodes may be connected to servers in a "star" topology shown by client 1(10) and client 2(20). Alternatively, client nodes may be "daisy-chained" together as depicted by client 2(20) and client 4(40). In still other embodiments, the client nodes may be connected in parallel as shown by client 3(30) and client 5(50). Client nodes may use any method for transmitting signals to a server node or receiving signals from a server node, so long as the client nodes 10, 20, 30, 40, 50 are in electrical communication with server node 60. Accordingly, client nodes 10, 20, 30, 40, 50 may be connected to client node 60 using any form of physical cabling capable of transmitting signals or any wireless network which allows the client nodes 10, 20, 30, 40, 50 to communicate with client node 60.

The server node 60 provides each client node 10, 20, 30, 40, 50 with access to shared application programs. Each node 10, 20, 30, 40, 50 may execute a different application program, every node 10, 20, 30, 40, 50 may be concurrently executing the same application program, or some subset of nodes 10, 20, 30, 40, 50 may be concurrently executing an application program while the remainder of the nodes are either idle or executing different application programs. Each server node 60 executes at least one application program for at least one client and accepts input data from that client and provides process data and display data to that client node.

In a multi-user, multi-tasking system as described in connection with FIG. 1, application programs must be written so that more than one copy of the application can run at the same time without object name collisions occurring. However, most application programs written for a single-user environment implicitly assume that only one copy of the application will be active in the system at a given time. Consequently, if more than one such application were to be run at the same time in a multi-user environment, there is a reasonable probability for name collisions to occur. This would make it impractical to use many existing single-user applications in a multi-user environment without modifying the application program.

In order to solve this problem and allow single-user application programs to be used in a multi-user environment without modification, all application program interface (API) calls by a given client node to create or modify named objects are intercepted and a user identifier is added to the name before it is passed on in the API call.

Figure 2:
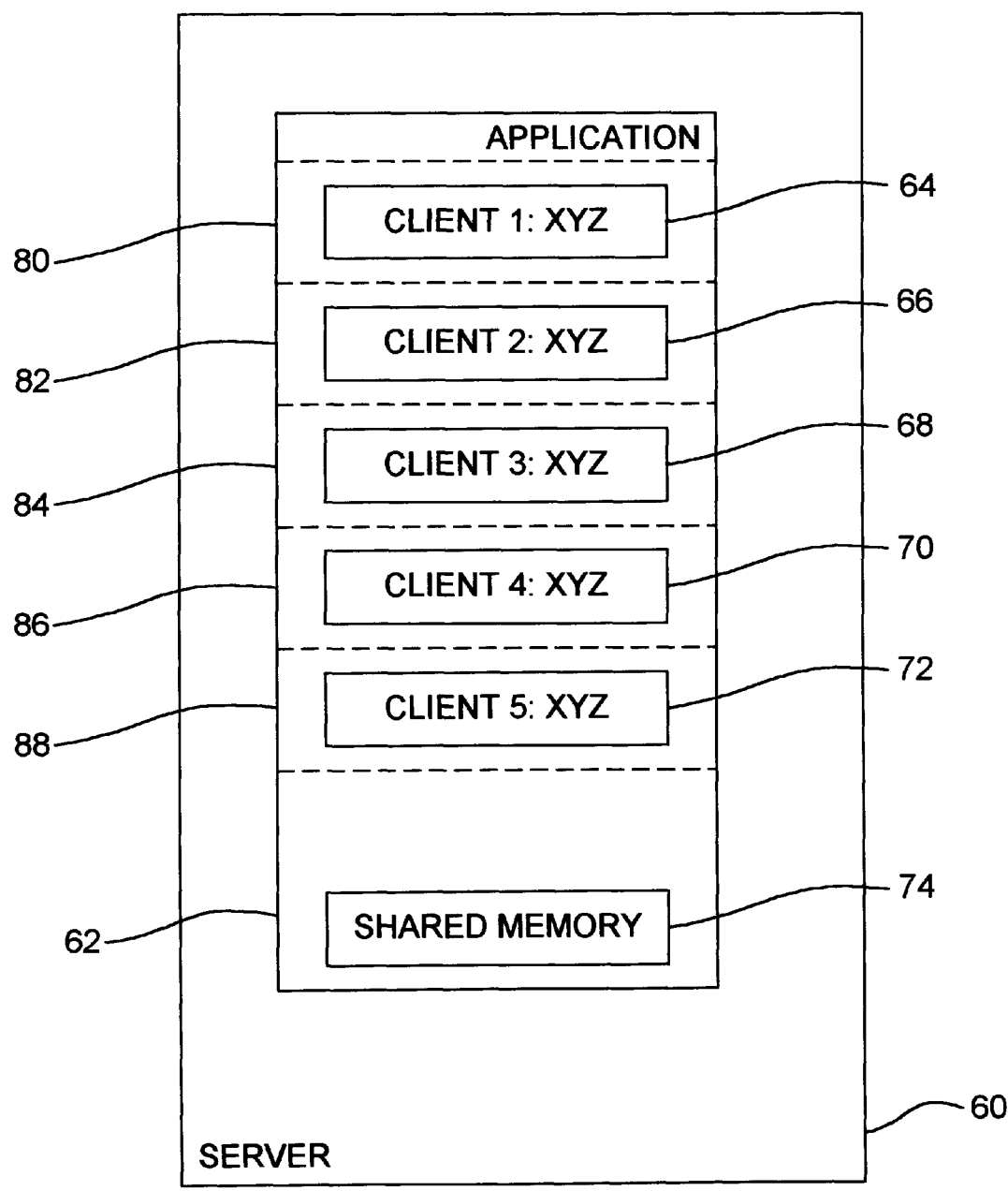
FIG. 2 is a block diagram of a server node as used in the local network depicted in FIG. 1.

The result of this solution is shown in FIG. 2. FIG. 2 shows a server node 60 which is executing an application program 62 on behalf of five client nodes. Each client node has a context 80, 82, 84, 86, 88 with which it is associated which includes the volatile registers, stacks and private storage area associated with the thread currently executing on behalf of the client. In FIG. 2, each client node has created an object named "XYZ". A user identifier has been added to the name of the object for each client context and, in this manner, each 64, 66, 68, 70, 72 named object has been made "user global". A named object that has been designated user global is sharable only within the given user's context. For example, because named object Client1:XYZ 64 is user global, it may be shared only by threads executing within the context of client 1 80. Threads executing within other contexts may not access named object Client1:XYZ 64. Throughout this description, when a named object is designated user global, it may be referred to as assigning a user global visibility level to the object.

This mechanism does not work well for named objects which must be sharable between more than one user's context, such as "SHARED_MEM" 74. Named objects sharable by multiple user contexts are referred to as being "system global". Throughout this specification this may be referred to as providing system global visibility to an object.

Figure 3:
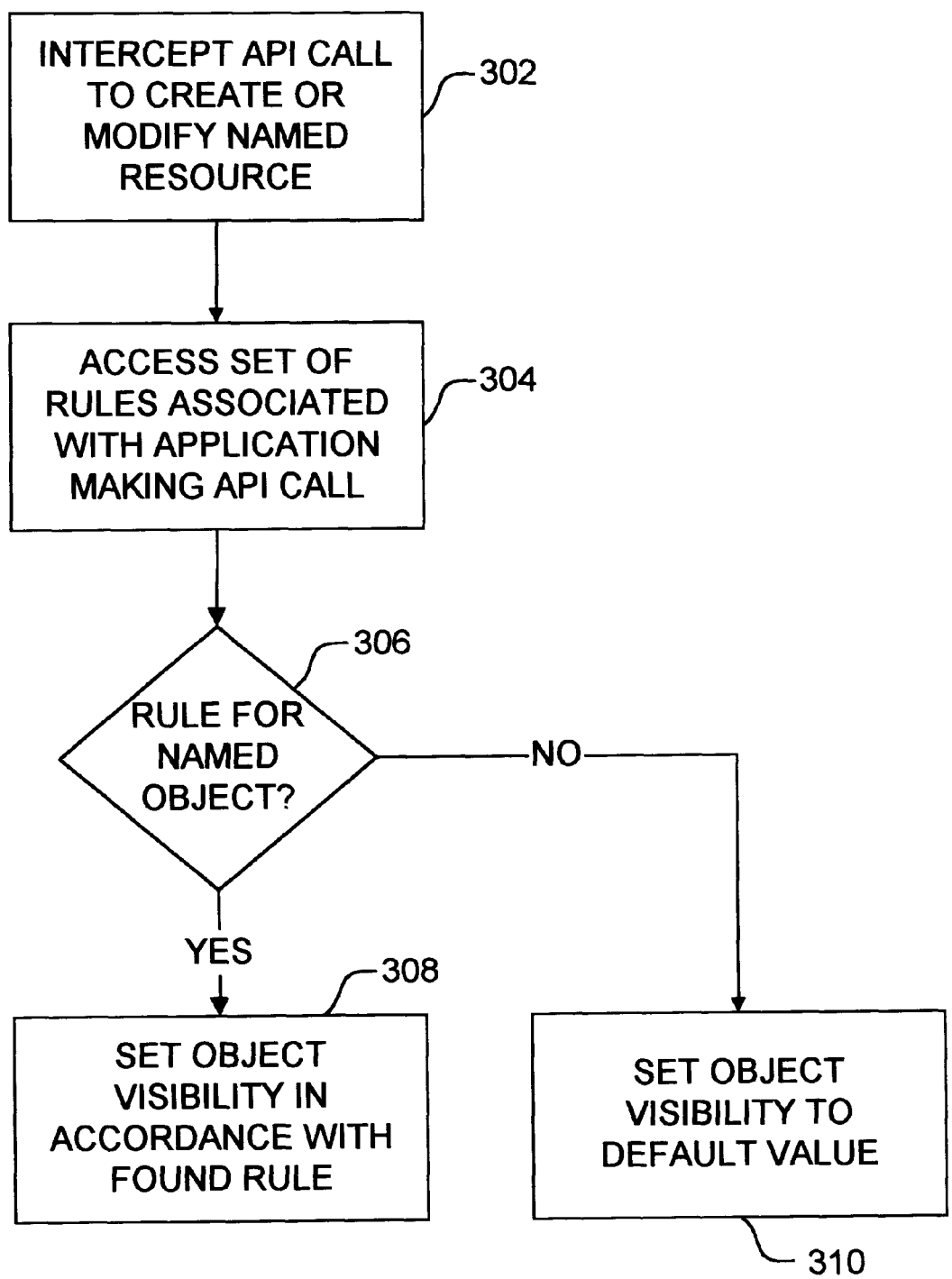
FIG. 3 is a flowchart of the steps to be taken to provide named objects that have user global and system global visibility.

Referring now to FIG. 3, and in brief overview, a method for allowing unmodified single-user applications executing in a multi-user environment to create and modify system objects, some of which have system global visibility and some of which have only user global visibility, begins by intercepting an API call to create or modify a named resource (step 302). A set of rules associated with the application making the API call is accessed (step 304). If a rule is found for a named object (step 306), then the object visibility is set in accordance with that rule (step 308). Otherwise, object visibility is set to some default value (step 310).

In greater detail, an API call made by an application to create or modify a named resource is intercepted (step 302). In one embodiment, API calls are intercepted by modifying the operating system to contain a replacement function having the same interface and the same name as the original function of the operating system. For example, a new function named "create_semaphore" may be provided to replace the "create_semaphore" function originally provided with the operating system. While it is desirable that the replacement function accept the same parameters as the original function it is replacing, this is not strictly necessary; the replacement function may accept only a pertinent set of parameters and discard the remainder. It is important that the replacement function have the same name, and be called in the same way, as the original function provided with the operating system in order to properly intercept an API call made by a single-user application.

In another embodiment, the original API function provided by the operating system is not replaced, but is modified in order to provide additional functionality associated with the invention. For example, additional code may be added to the existing API function by means of a subroutine or other sub-function inserted into the API function code. In other embodiments, the additional functionality required by the invention may be provided in hardware and an API function call may trigger an interrupt which causes execution of the additional instructions contained in hardware.

Some examples of API function calls which may be intercepted are: "create_semaphore"; "create_event", "create_mutex"; "create_file"; "open_semaphore"; and "open_event".

Whatever method is used to intercept the API call, once it is intercepted, a set of rules associated with the application making the API call is consulted (step 304). The set of rules may be provided as any data structure which allows the operating system to access the set of rules in order to determine the visibility for a particular object invoked by a particular application, e.g. the rule set may be provided as a data table, a linked list of records, an array of records, or a text file. Object rules should be grouped by application, since different applications will have different visibility levels desired or required for named objects. In one embodiment, a separate set of rules may be provided for each application and the operating system accesses only the rules associated with the application making the API function call. In other embodiments, all of the rules are included in one file or table, but are grouped so that the operating system can determine the set of rules for a particular application.

Each rule in a set of rules explicitly provides the visibility level that should be associated with a particular named object. Additionally, the visibility level for certain named objects may be implicitly provided by using a "wild card" mechanism. For example, a set of rules may define that named objects titled "CS*" are to be made user global. This rule would result in objects CS0, CS_MEM_PIPE, as well as CSHAREDMEM being defined as user global named objects.

The set of rules for a given application may reside on disk, and the operating system may load the rules each time it needs to access them. Alternatively, rules may be cached and the operating system may access the rule cache for a match when creating or modifying an object. For example, in WINDOWS NT™ when an application starts up, it links to a library titled "kernel 32.dll". The object rules for that application may be cached when "kernel 32.dll" is loaded.

In one embodiment, the configuration registry of the WINDOWS NT™ is used to provide the set of rules accessed in step 304. The configuration registry is a repository for all information about the computer hardware that the operating system is running on, the software installed on the system, and the person or persons using the system.

The purpose of the registry and its associated software is to make systems easy to manage by examining the hardware at boot time and configuring as much of the system automatically as possible. The information gleaned in this manner is stored in the registry. Device drivers, applications, and users can also place information by using a registry editor. Information in the configuration registry is stored in key objects, which are subject to the security mechanisms and other semantics applied to NT executive objects. This design allows WINDOWS NT™ to maintain a unified storage facility for this seemingly random information and, at the same time, to make it available in a distributed but secure manner on networked systems.

In this example, an OBJECTRULES key object may be provided under an existing key object in the registry. For example, the OBJECTRULES key may be provided under the SOFTWARE/Citrix/Compatibility/Applications/APPNAME. In general, APPNAME is the name of an application that creates and modifies named objects. Table 1 below defines an exemplary, but not exhaustive, set of values that may be entered under the OBJECTRULES key.

TABLE 1

| Value | Data Type | Description |
|---|---|---|
| SystemGlobalSemaphores | REG_MULTI_SZ | List of system global semaphore names |
| SystemGlobalEvents | REG_MULTI_SZ | List of system global events |
| SystemGlobalMutexes | REG_MULTI_SZ | List of system global mutexes |
| SystemGlobalSections | REG_MULTI_SZ | List of system global sections |
| UserGlobalSemaphores | REG_MULTI_SZ | List of user global semaphore names |
| UserGlobalEvents | REG_MULTI_SZ | List of user global events |
| UserGlobalMutexes | REG_MULTI_SZ | List of user global mutexes |
| UserGlobalSections | REG_MULTI_SZ | List of user global sections |

As noted above, if a rule for the named object is found (step 306) then the object visibility is set in accordance with that rule (step 308). However, if no rule exists for the named object to be created or modified, then the object's visibility may be set to a default value (step 310). For example, the object may be designated as "user global" or "system global" if the API function call is contained in a DLL that is itself registered as user global or system global, respectively. Otherwise, the object will be set to user global visibility or system global visibility based on the default attributes for a given object type.

As noted above, a named object for which there is no rule will be set to the visibility of the DLL that provides the function creating or modifying the object. Accordingly, the rules for objects created by the DLL would have to be duplicated for all applications using the DLL. This problem may be avoided by creating a set of rules for each DLL which are consulted when the named object is created or modified.

Using the example of the WINDOWS NT™ registry above, an OBJECTRULES structure for DLLs may be created and entered in the registry. For example, the DLL entry SOFTWARE/Citrix/Compatibility/DLL/DLLNAME/OBJECTRULES may be made which identifies a DLL for which a set of rules is created. DLLNAME could also be a fictitious name representing a group of unrelated DLLs. Thus, only a single registry value for an application would pick up rules for the DLLs that the application may invoke for example, the following registry entries SOFTWARE/Citrix/Compatibility/Applications/GenericApplication/OBJECTRULES/DLLRULES:GenericServer SOFTWARE/Citrix/Compatibility/DLL/GenericServer/OBJECTRULES/SystemGlobalSemaphores:CS000* would result in the GenericApplication application using the OBJECTRULES associated with GenericServer. Since any Semaphores created by the DLLs associated with GenericServer that begin with "CS000" are given SystemGlobal availability, any Semaphore created by GenericApplication having a name starting with "CS000" will also be created SystemGlobal.

The present invention may be provided as one or more computer readable programs embodied on or in one or more articles of manufacture. Article of manufacture may be a floppy disk, a hard disk, an optical disk, a CD ROM, a flash memory card, a PROM, a RAM, a ROM, a magnetic tape, or any other media capable of digital information storage. In general, the computer-readable programs may be implemented in any programming language such as C, C++, or any other object-oriented programming language providing for the creation, deletion, and modification, of data objects. The software programs may be stored on or in one or more articles of manufacture as object code or source code.

Having described certain embodiments of the invention, it will now become apparent to one skilled in the art that other embodiments incorporating the concepts of the invention may be used. Therefore, the invention should not be limited to certain embodiments, but rather should be limited only by the spirit and scope of the following claims.

What is claimed is:

1. A method for allowing an unmodified single-user application program to operate in a multi-user operating system environment and to create both user-global objects and system-global objects, the method comprising the steps of:

(a) intercepting a request from the unmodified single-user application program directed at a default function of the operating system to instantiate an object, the interception being effected by directing the request to an alternate function, the alternate function replacing the default function and having the same name and being called in the same way as the default function;

(b) determining a visibility level for the object;

(c) instantiating the object; and (d) assigning the determined visibility level to the instantiated object.

2. The method of claim 1 wherein step (b) further comprises:

(b-a) accessing a data table including a mapping between objects and visibility levels;

(b-b) locating an entry corresponding to the object; and (b-c) determining from the located entry a visibility level for the object.

3. The method of claim 2 wherein step (b-a) comprises accessing a registry data structure including a mapping between objects and visibility levels.

4. The method of claim 1 wherein step (d) further comprises assigning the determined visibility level to the instantiated object by setting an attribute bit associated with the instantiated object.

5. The method of claim 1 wherein step (d) further comprises assigning the determined visibility level to the instantiated object by assigning a level to the instantiated object indicative of the determined visibility level.

6. The method of claim 1, wherein the alternate fuinction accepts only a subset of parameters normally accepted by the default function of the operating system.

7. The method of claim 1, wherein the alternate function of step (a) is formed by replacing a portion of the default function of the operating system by inserting additional code into the default function.

8. A method for allowing an unmodified single-user application program to operate in a multi-user operating system environment and to create both user-global objects and system-global objects, the method comprising the steps of:

(a) intercepting a request from the unmodified single-user application program directed at a default function of the operating system to instantiate an object, the interception being effected by directing the request to an alternate function, the alternate function replacing the default function and having the same name and being called in the same way as the default function;

(b) triggering an interrupt in response to the intercepted request that executes instructions in a hardware device coupled to the unmodified single-user application program, (c) determining a visibility level for the object;

(d) instantiating the object in response to the instructions executed by the hardware device coupled to the unmodified single-user application program; and (e) assigning the determined visibility level to the instantiated object.

9. A method for overriding a default operation of a multi-user operating system when executing a single-user application program under control of the multi-user operating system, comprising the steps of:

a) intercepting an application program interface call directed to a default function of the multi-user operating system for instantiating a named object associated with the execution of the single-user application program prior to instantiating the named object by the multi-user operating system, the interception being effected by directing the application program interface call to an alternate function, wherein the alternate function replaces the default function and has the same name and is called in the same way as the default function of the multi-user operating system;

b) accessing, via the alternate function of the multi-user operating system, a set of rules associated with the single-user application program to determine a visibility level for the named object; and c) instantiating the named object in accordance with the set of rules, wherein steps a)-c) are performed without modifying the single-user application program.

10. The method of claim 9 further comprising the step of forming the alternate function by replacing a portion of the code in the default function.

11. An article of manufacture having computer-readable program means for allowing an unmodified single-user application program to operate in a multi-user operating system environment and to create both user-global objects and system-global objects embodied thereon, comprising:

(a) computer-readable program means for intercepting a request directed at a default function of the operating system to instantiate an object from the unmodified single-user application program the interception being effected by directing the request to an alternate function, the alternate function replacing the default function and having the same name and being called in the same way as the default function; (b) computer-readable program means for determining a visibility level for the object;

(c) computer-readable program means for instantiating the object; and (d) computer-readable program means for assigning the determined visibility level to the instantiated object.

12. The article of claim 11 further comprising:

(b-a) computer-readable program means for accessing a data table including a mapping between objects and visibility levels;

(b-b) computer-readable program means for locating an entry corresponding to the object; and (b-c) computer-readable program means for determining from the located entry a visibility level for the object.

13. The article of claim 11 further comprising computer-readable program means for accessing a registry data structure including a mapping between objects and visibility levels.

14. The article of claim 11 further comprising computer-readable program means for assigning the determined visibility level to the instantiated object by setting an attribute bit associated with the instantiated object.

15. The article of claim 11 further comprising computer-readable program means for assigning the determined visibility level to the instantiated object by assigning a level to the instantiated object indicative of the determined visibility level.

* * * * *

UNITED STATES PATENT AND TRADEMARK OFFICE
CERTIFICATE OF CORRECTION

PATENT NO. : 6,023,721
DATED : February 8, 2000
INVENTOR(S) : Cummings

It is certified that error appears in the above-identified patent and that said Letters Patent is hereby corrected as shown below:

Column 7, line 53, claim 6, replace "fuinction" with --function--.
Column 8, line 50, claim 11, after "program" insert -- , --.
Column 8, line 54, claim 11, begin element "(b)" on the next line.
Other publications, 1<sup>st</sup> reference, replace "Dobbs's" with -- Dobb's --.

Signed and Sealed this

Second Day of January, 2001

Attest:

Q. TODD DICKINSON

*Attesting Officer*    *Commissioner of Patents and Trademarks*